(12) United States Patent
Kistler (10) Patent No.: US 6,875,322 B1
(45) Date of Patent: Apr. 5, 2005

(54) ELECTROCHEMICAL ASSISTED CMP

(75) Inventor: Rodney C. Kistler, Los Gatos, CA (US)

(73) Assignee: Lam Research Corporation, Fremont, CA (US)

( * ) Notice: Subject to any disclaimer, the term of this patent is extended or adjusted under 35 U.S.C. 154(b) by 11 days.

(21) Appl. No.: 10/345,775

(22) Filed: Jan. 15, 2003

(51) Int. Cl.⁷ .......................... C25B 15/00; C25D 17/00
(52) U.S. Cl. .................. 204/238; 204/239; 204/224 M
(58) Field of Search ................................ 204/237–241, 204/224 M (56) References Cited

U.S. PATENT DOCUMENTS

| | | | | |
|---|---|---|---|---|
| 3,649,509 | A | * | 3/1972 | Morawetz et al. .......... 204/238 |
| 5,344,491 | A | * | 9/1994 | Katou ........................ 118/695 |
| 6,121,152 | A | | 9/2000 | Adams et al. |
| 6,132,586 | A | | 10/2000 | Adams et al. |
| 6,143,155 | A | | 11/2000 | Adams et al. |
| 6,176,992 | B1 | | 1/2001 | Talieh |
| 6,203,412 | B1 | | 3/2001 | Quek |
| 6,261,433 | B1 | | 7/2001 | Landau |
| 6,267,853 | B1 | * | 7/2001 | Dordi et al. ................ 204/232 |
| 6,315,883 | B1 | | 11/2001 | Mayer et al. |
| 6,387,807 | B1 | | 5/2002 | Faubert et al. |
| 6,413,388 | B1 | | 7/2002 | Uzoh et al. |
| 6,413,403 | B1 | | 7/2002 | Lindquist et al. |
| 6,440,291 | B1 | | 8/2002 | Henri et al. |
| 6,440,295 | B1 | | 8/2002 | Wang |
| 6,454,916 | B1 | | 9/2002 | Wang et al. |
| 6,455,415 | B1 | | 9/2002 | Lopatin et al. |
| 6,475,369 | B1 | | 11/2002 | Cohen |
| 6,482,307 | B2 | | 11/2002 | Ashjaee et al. |

* cited by examiner

*Primary Examiner*—Donald R. Valentine
(74) *Attorney, Agent, or Firm*—Martine Penilla & Gencarella, LLP (57) ABSTRACT

A method for material removal and planarization of a substrate includes formation of a weak passivating film on overburden to be removed in the presence of an electrolyte bath and an applied electric potential. An engineered polishing substrate is brought into compliance with the weak passivating film, and using low pressure to minimize shear stress realized at the surface of the substrate, material removal is controlled by mechanical contact between the polishing substrate and the weak passivating film. The weak passivating film is periodically reformed, and mechanical contact continued until desired material removal and substrate planarization is achieved.

8 Claims, 8 Drawing Sheets

ELECTROCHEMICAL ASSISTED CMP

CROSS REFERENCE TO RELATED APPLICATIONS

This application is related to the following applications: U.S. patent application Ser. No. 10/345,694, filed Jan. 15, 2003, and entitled "CHEMICAL MECHANICAL PLANARIZATION (CMP) APPARATUS," and U.S. patent application Ser. No. 10/345,658, filed Jan. 15, 2003, and entitled "PLANARIZATION MEDIA FOR CHEMICAL MECHANICAL PLANARIZATION (CMP)." These related applications are incorporated herein by reference.

BACKGROUND OF THE INVENTION

1. Field of the Invention

The present invention relates generally to the planarization of substrates, and more specifically to methods and apparatus for low stress metallization removal and substrate planarization.

2. Description of the Related Art

In the fabrication of semiconductor devices, integrated circuits are defined on semiconductor wafers by forming a plurality of layers over one another resulting in multilevel structures. Features such as trenches, vias, interconnect lines, and the like are defined within and through one or more layers, typically followed by the deposition of metallization or other conductive material fill, hereinafter referred to as conductive fill, over the defined pattern features. Chemical Mechanical Planarization (CMP) is one fabrication process used to remove overburden resulting from conductive fill deposition, and to planarize the surface of a semiconductor wafer in which a surface topography develops as a result of the various layers disposed over one another. Additional applications of CMP include cleaning, buffing, polishing, planarizing, and otherwise processing substrates used in such applications as flat panel displays, hard disks, and the like.

Figure 1A:
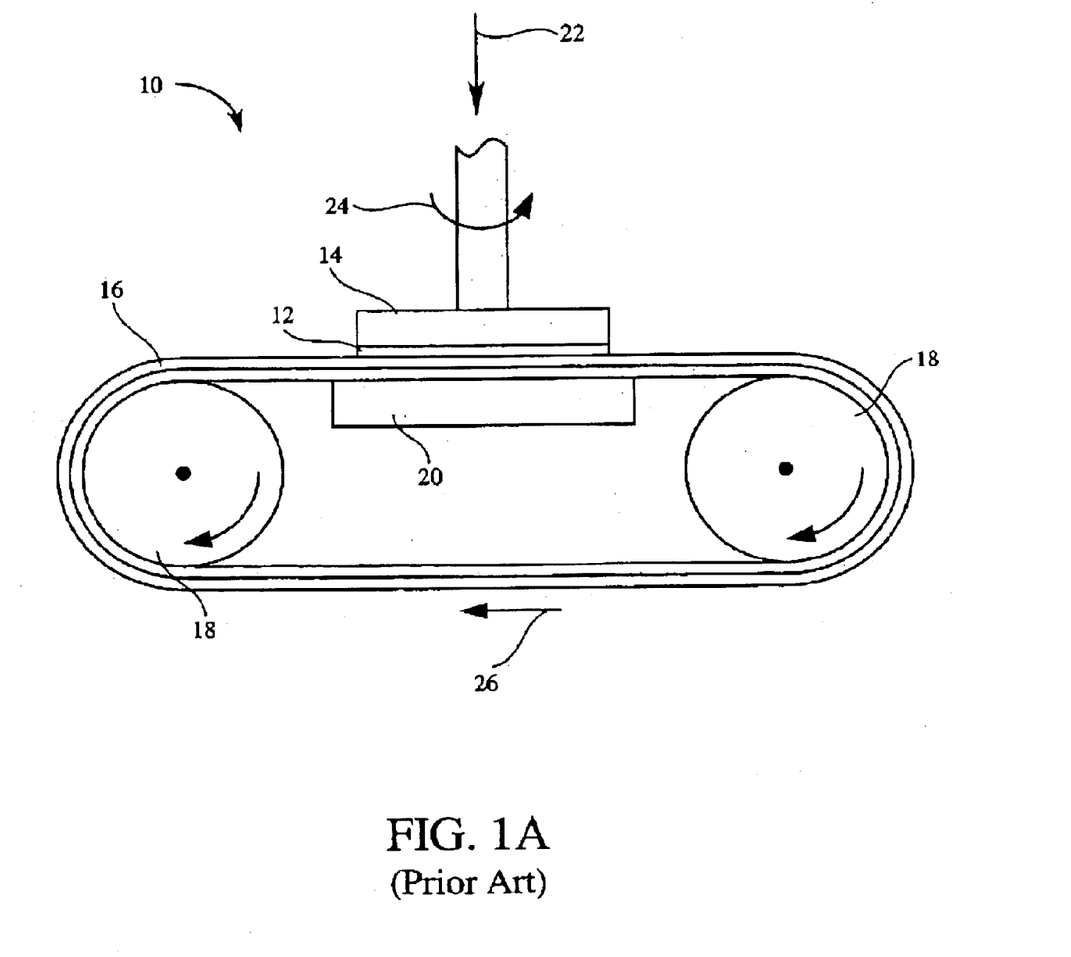
FIG. 1A shows a typical linear CMP apparatus having a substrate attached to a carrier, and applied against a preparation surface.

In general, CMP processes involve a chemically-assisted mechanical removal of material from the surface of a substrate. Usually, CMP is accomplished by the holding and rotating of a substrate which is applied against a preparation surface under a controlled pressure. FIG. 1A shows a typical linear CMP apparatus 10 having a substrate 12 attached to a carrier 14, and applied against a preparation surface 16. The preparation surface 16 is a surface of a continuous loop belt supported between two or more drums or rollers 18 which move the belt through a rotary path, as indicated by arrow 26, presenting a flat preparation surface 16 against which the substrate 12 is applied. Typically, the substrate 12, supported by the carrier 14, is rotated as shown by arrow 24, and applied against the preparation surface 16 with a downward pressure or force as indicated by arrow 22. A platen 20 may be configured on the underside of the belt traveling in its circular path. The platen 20 provides a stable surface over which the belt travels, and the wafer 12 is applied to the preparation surface 16 of the belt against the stable surface provided by the platen 20.

Figure 1B:
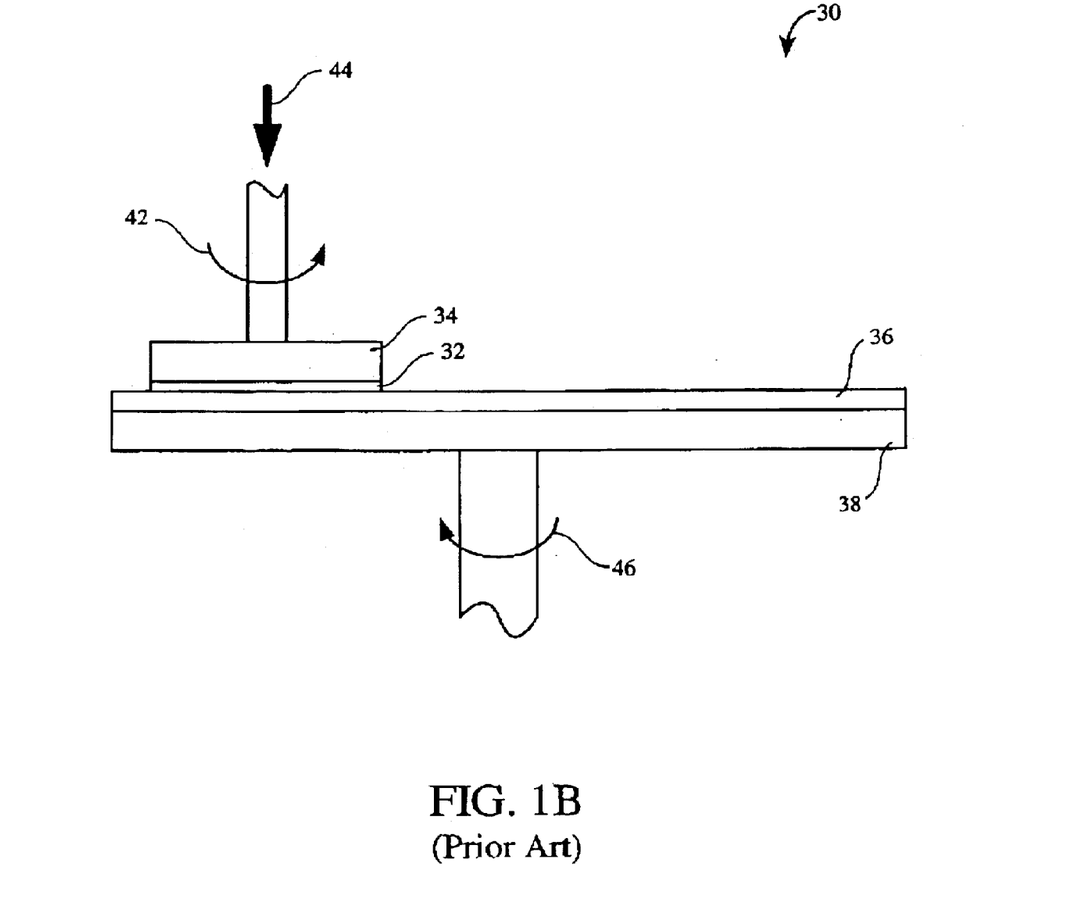
FIG. 1B shows one example of a rotary CMP processing tool.

CMP apparatus further include rotary CMP processing tools having a circular pad configuration for the preparation surface. FIG. 1B shows one example of a rotary CMP processing tool 30. In the configuration illustrated in FIG. 1B, a substrate 32 is attached to a carrier 34 and applied against a preparation surface 36 of a rotary table 38. The substrate 32 on carrier 34 is typically rotated as indicated by arrow 42 and applied against the preparation surface 46 with a downward force 44. The preparation surface 36 is also rotated with the rotation of the rotary table 38 as indicated by arrow 46.

Figure 1C:
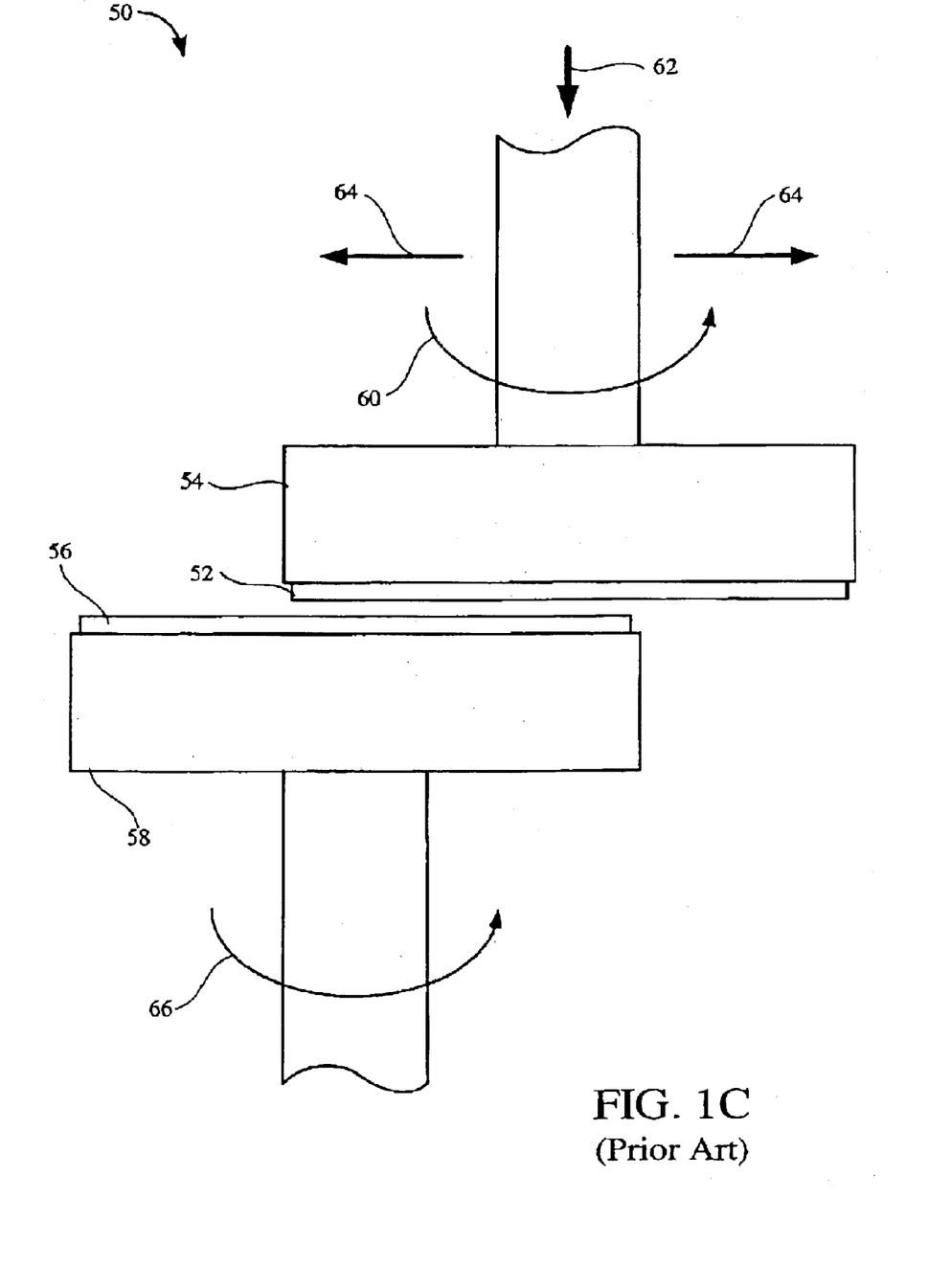
FIG. 1C shows a subaperture CMP tool.

FIG. 1C illustrates yet another configuration of CMP processing apparatus. FIG. 1C shows a subaperture CMP tool 50. In a subaperture CMP tool 50, a substrate 52 is attached to a carrier 54, and applied against a preparation surface 56 attached to a polishing head 58. Carrier 54 is typically configured to rotate as indicated by arrow 60, and to apply the substrate 52 against the preparation surface 56 with a downward force as indicated by arrow 62. Further, lateral movement of the substrate 52 across the preparation surface 56 is shown by arrows 64. The preparation surface 56 is rotated with polishing head 58 as shown by arrow 66.

As illustrated in FIGS. 1A, 1B, and 1C, typical CMP processing results in a plurality of forces acting upon the surface of a substrate. Such forces include the downward force of the application of the substrate against the processing surface, and the rotational and lateral forces of the rotating substrate, the rotating preparation surface, and the lateral positioning of the substrate on the preparation surface. The processing forces result in significant shear stress on the surface of the substrate being planarized or otherwise processed. As described above in reference to semiconductor manufacturing, the surface of the substrate may include overburden of conductive fill, and as the overburden is removed, the substrate surface may include a barrier layer and the dielectric layer in which patterns and other features have been formed, with the conductive fill filling the patterns and other features.

In the continuous process of improving integrated circuit performance, semiconductor manufacturing is migrating more and more to copper as the metal of choice for interconnects, and low-k dielectric layers that are increasingly porous in order to achieve a low dielectric constant. The porous, low-k dielectric material which serves as an insulating material for the copper or other metal wiring is fragile, and particularly susceptible to fracture and tearing under applied shear stress.

In addition to the fragile, porous low-k dielectric material, fabrication challenges also include progressively smaller feature sizes. In order to effectively define and fill features of some current and next generation fabrication processes, at least molecular manipulation of copper or other metal selected is rapidly becoming desired or necessary. In response, the industry has begun to further develop electroplating deposition of conductive fill and to expand and implement electropolish processes to remove overburden and planarize the surface of the substrate.

Electropolish processes for the removal of copper or other metal overburden, and for planarization of a substrate, are generally deficient with respect to stringent overburden removal and planarization requirements. Electropolish material removal is intrinsically isotropic, and is unable to be implemented for selective removal of hundreds or a few thousands of angstroms (Å) of topography. Further, the material removal process for copper (Cu) is governed by grain boundary activation for initiating material removal. A polycrystalline material, Cu exhibits wide variation in grain boundary density as a function of in-laid pattern feature geometry and density. As a result, electropolish and other removal rates can vary widely between feature sizes of, for example, $1.0\mu$ in width down to $0.25\mu$ in width.

In view of the foregoing, methods and apparatus are needed that can be successfully and efficiently implemented to realize precise material removal within stringent tolerances of current and evolving feature sizes, and that can be implemented with porous, low-k dielectric layers forming and within a substrate.

SUMMARY OF THE INVENTION

Broadly speaking, the present invention fills these needs by providing apparatus and methods for material removal and substrate planarization that provides more precise control of material removal and minimizes shear stresses at the surface of the substrate. Several exemplary embodiments of the present invention are described below.

In accordance with one aspect of the present invention, an electrochemical assisted CMP processing system is provided. In one embodiment, the electrochemical assisted CMP processing system includes a substrate processing chamber having an electrolyte bath contained therein. A substrate carrier and a polishing head having a polishing substrate attached are positioned within the electrolyte bath, and a recirculation system is provided for the electrolyte bath. The recirculation system includes chemical analysis, filtration, and temperature control of the electrolyte bath. The electrochemical assisted CMP processing system is configured to receive an electric potential with the substrate carrier receiving a cathode charge and the polishing head receiving an anode charge to create an electrochemical reaction on a surface of a substrate positioned on the substrate carrier and immersed in the electrolyte bath.

In accordance with another aspect of the invention, a method for planarizing a substrate is provided. In this method, a substrate is immersed in an electrolyte bath and an electric potential is applied. A passivation layer is formed over an upper surface of an overburden of a conductive fill, and a polishing substrate is brought in compliance with the upper surface of the conductive fill. The polishing substrate is oriented parallel to a plane of the surface of the substrate. Thereafter, a portion of the passivation film in compliance with the polishing substrate is mechanically abraded, and the passivation film is reformed where abrasion has effected material removal of the conductive fill. The abrading of the passivation film and the subsequent reforming is repeated until the overburden is removed and the surface of the substrate is planarized.

In accordance with yet another aspect of the invention, a method of removing copper metal overburden from a porous low-k dielectric substrate is provided. In this method, a porous low-k dielectric substrate is immersed in an electrolyte solution and a weak passivating film is formed on a surface of the copper metal in the presence of an electrolyte solution and an electric potential. Thereafter, the weak passivating film is abraded and then reformed until the copper metal overburden is removed and a surface of the porous low-k dielectric substrate is planarized.

The present invention provides a number of significant advantages. One notable benefit and advantage of the invention is by minimizing the shear stresses realized at the surface of the substrate during processing, the process is ideally suited for fragile, porous low-k dielectric films with copper metallization. The downforces exerted during processing remain less than 1 psi, and so tearing and fracture notably associated with porous and highly porous low-k dielectrics is minimized or eliminated.

Another benefit is economy and efficiency of implementation. With the growing use of electroplating methods and apparatus to deposit conductive fill in smaller and smaller feature sizes, embodiments of the present invention implement similar processes that can be realized with minimal modification of existing apparatus. Both CMP and electroplating are known and used processes, making necessary and desired components of the present invention readily accessible.

An additional benefit is the ability to achieve desired control of the removal to meet stringent requirements within exacting tolerances of next generation processes. In conventional CMP processes, minimizing applied forces yields unacceptably low removal rates, reduced productivity, and increased cost of production. Embodiments of the present invention provide for minimal force application with sufficient removal rate combined with the necessary control of the process in the small feature environment.

Other advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for electrochemically assisted CMP for material removal and substrate planarization is disclosed. In preferred embodiments, electrochemical assisted CMP includes electrochemical formation of a weak passivation film on the surface of a substrate and material removal driven by mechanical contact with an engineered polishing substrate. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, embodiments of the present invention provide for a combination of electrochemical dissolution with low stress mechanical abrasion. A process of electropolishing uses controlled, minimal electrochemical dissolution of the copper or other metal overburden, and accomplishes material removal using mechanical abrasion of the oxidation or passivation layer formed by the electrochemical process. The mechanical abrasion is performed with an engineered rigid porous substrate applied against the formed passivation layer with minimal downforce. Formation of the passivation layer is repeated and cycled until desired material removal and planarization is achieved.

Figure 2A:
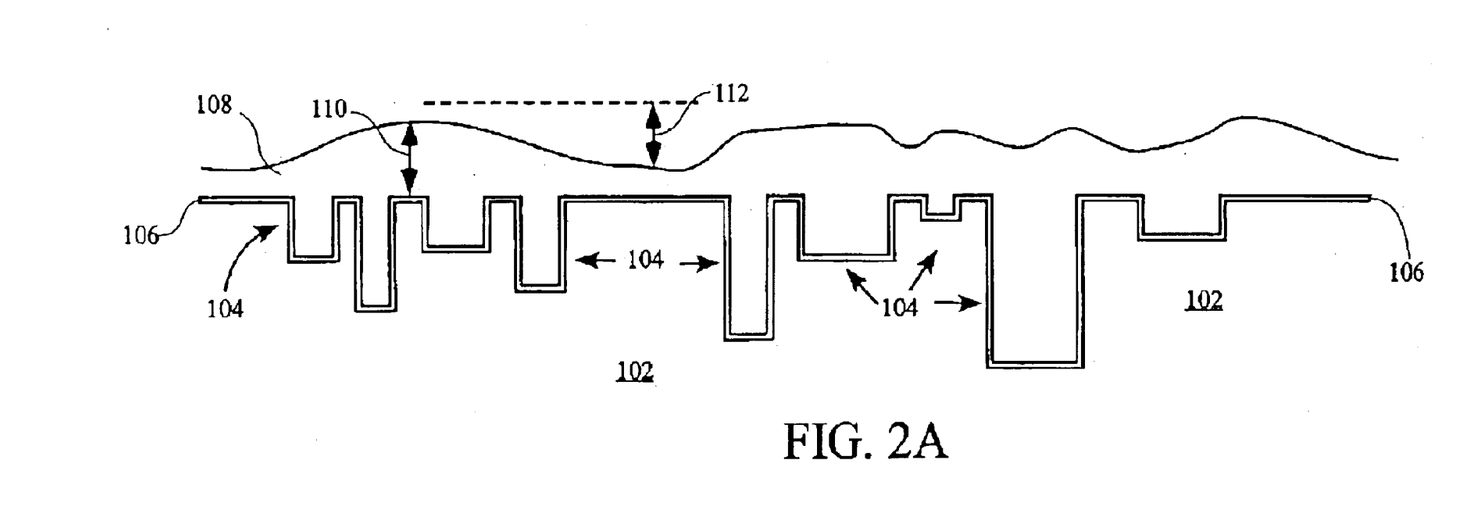
FIG. 2A illustrates a typical electroplating profile.

In a typical electrochemical process, conductive fill, such as copper, can be deposited, known as electroplating, over a patterned substrate to fill the features as desired. By use of compounds known as leveling agents, features are essentially filled from the bottom up, and the resulting overburden presents a nearly flat layer. Typically, the overburden is higher over areas of dense patterning, and lower over areas of less dense patterning, although this phenomenon is reduced with the use of leveling agents. FIG. 2A illustrates a typical electroplating profile. Exemplary features 104 are shown patterned in a substrate 102. The substrate can be a silicon wafer, an intermetal dielectric such as silicon dioxide, a porous low-k dielectric, or any type or layer of substrate 102 in which features 104 have been defined. A representative barrier 106 is shown lining the features 104 and protecting the substrate 102 from diffusion of the deposited metal layer 108.

The metal layer 108, deposited by electroplating, yields overburden that must be removed until the surface of the substrate 102 is planarized at the substrate 102, and the metal remains filling the features 104. Even with the relatively flat profile achieved with electroplating, the overburden of the metal layer 108 can reach a height of approximately 3000 angstroms, shown at 110, with a range in variation of the overburden of the metal layer 108 of over approximately 1000 angstroms, shown at 112. As used throughout this application, the terms "approximately" and "about" are used to convey reasonable deviation from defined terms, measurements, specifications, and the like. Reasonable deviation should be understood to be plus/minus 10%.

If the electroplating process were simply to be reversed, that is, the polarity were to be reversed between the anode and the cathode of an electroplating apparatus, then electrochemical removal occurs. As discussed above, simple reversal of the electroplating process results in essentially isotropic material removal. Therefore, if a variation in height of the overburden of the metal layer 108 is over approximately 1000 angstroms as shown at 112, then in a resulting substrate having the overburden of the metal layer 108 removed by a reversed electroplating process, the metal-filled features 104 can have metal loss of over approximately 1000 angstroms, realized as dishing.

Figure 2B:
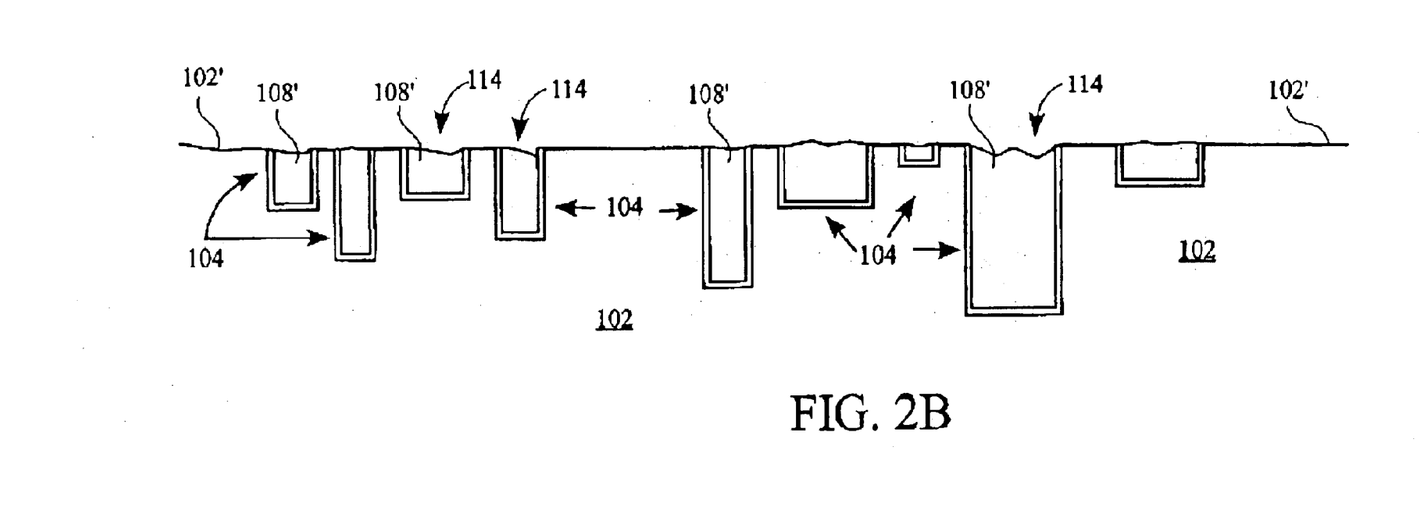
FIG. 2B shows an exemplary profile of material removal by a reversed electroplating process.

FIG. 2B shows an exemplary profile of material removal by a reversed electroplating process. Substrate 102 as described above in FIG. 2B, having features 104 defined therein, has had the overburden of metal layer 108 (see FIG. 1A) removed so that remaining metal 108' fills features 104. Substrate surface 102', however, is not planarized. Due to the isotropic removal of metal layer 108 during reversed electroplating, the range in the height of the metal layer 108 at the beginning of the process (see FIG. 2A) is essentially maintained through the process. Therefore, dishing 114 is apparent in the remaining metal 108' within features 104.

Further, as described above, material characteristics of the selected metal layer 108 can contribute to removal imbalances. By way of example, in polycrystalline copper, as feature size gets smaller, grain growth of copper is constrained. The resulting grain orientation in small features, such as trenches less than approximately $1.0\mu$ in width, causes an imbalance in material removal by reversed electroplating, contributing to the dishing 114 evident in FIG. 2B.

Figure 3:
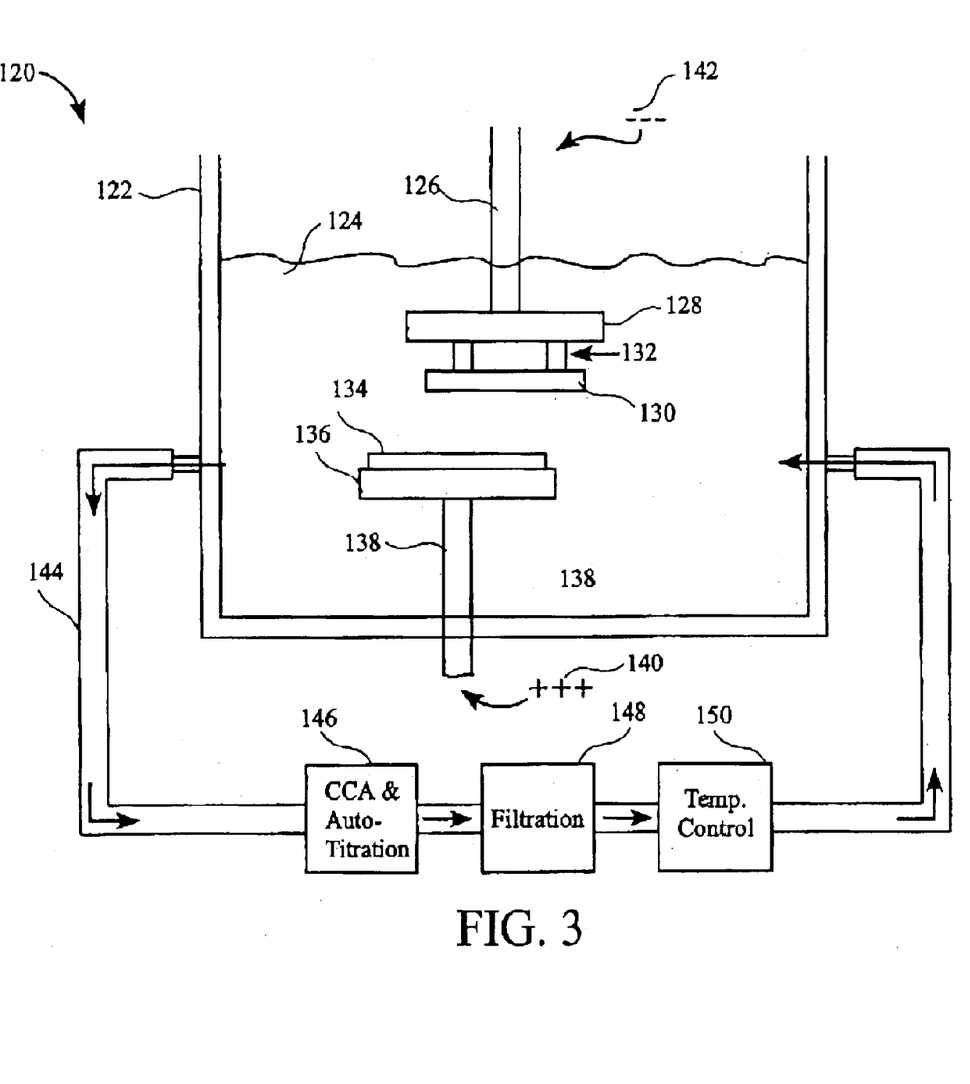
FIG. 3 shows an electrochemical assisted CMP processing system in accordance with one embodiment of the present invention.

FIG. 3 shows an electrochemical assisted CMP processing system 120 in accordance with one embodiment of the present invention. The electrochemical assisted CMP processing system 120 includes a chamber 122 in which is contained an electrolyte bath 124. An upper spindle, 126 holds a polishing head 128, to which is attached a polishing substrate 130. In one embodiment, a fixed separation 132 is created between the polishing head 128 and the polishing substrate 130, allowing the polishing substrate 130 to be completely immersed and surrounded by the electrolyte bath 124. A substrate 134 that is to be planarized is attached to a carrier 136 which is attached to a lower spindle 138. During processing, upper spindle 126 is charged as anode 142, and lower spindle 138 is charged as cathode 140.

In one embodiment, a chemistry of the electrolyte bath 124 is selected in accordance with the metal overburden to be removed from substrate 134, the amount of overburden to be removed, the polishing substrate 130 selected for use, and other such variable factors. Chemistries selected for electrolyte bath 124 are selected from conventional electrolytic solutions used in electrochemical deposition and known in the art. In another embodiment, chemistries for the electrolyte bath 124 are selected from conventional CMP slurry chemistries without abrasives which are also known in the art. The pH of the selected chemistries can range from acidic to basic in an approximate range of about 1 to about 12, with a preferred range of about 2 to about 9.

In one embodiment, the electrolyte bath 124 is caused to circulate 144 through and within chamber 122. Electrolyte bath circulation 144 is used to maintain a desired concentration, volume, temperature, and other such chemical variables of the electrolyte bath 124. In one embodiment, chemical analysis and auto-titration 146 of the electrolyte bath 124 is provided, along with chemical recharging or refreshing. Also provided are filtration 148, temperature monitoring and control 150, and any other chemical maintenance of the electrolyte bath 124 as desired.

In one embodiment of the invention, a combination of the chemistry selected and the electric potential applied is used to form an oxidation layer over the surface of the overburden to be removed. The oxidation layer formed is sufficient to cover the overburden, but not so robust as to initiate or cause material removal. Further, the oxidation layer, once formed, serves to protect underlying metal from continued electrochemical dissolution. In one embodiment, the formation of the oxidation layer, also referred to as a passivation layer or passivating film, is caused and strictly controlled by a weak application of a reversed electroplating process. By way of example, the applied DC potential is in the range of approximately 0.1–2 amp/cm$^2$, and is pulsed or varied to be applied from 5%–100% of a process cycle. In this manner, the surface of the overburden is covered with a preferential, weak passivating film which is susceptible to chemical dissolution through mechanical contact, while the underlying metal is protected from dissolution. The thickness and the hardness of the passivating film is controlled through electrical field and chemistry optimization.

Mechanical contact to achieve material removal is applied with the polishing substrate 130. In one embodiment, the polishing substrate 130 is a rigid, porous substrate used to govern the plane of material removal. In one embodiment, the polishing substrate 130 is equal in size to the substrate 134 that is to be planarized. In another embodiment, the polishing substrate 130 is smaller than the substrate 134 that is to be planarized. As described above, the amount of metal overburden to be removed can be up to approximately 3000 angstroms, and developing technological requirements prohibit in-feature metal loss of no more than approximately 200 angstroms, with dishing no greater than approximately 80 angstroms. Conventional CMP polishing pads and surfaces have a mean surface roughness, also referred to as a root mean square roughness and denoted RMS, of approximately 5 μm, or approximately three to five orders of magnitude greater in roughness than planarized tolerance. Additionally, conventional CMP pads and surfaces can have pores of approximately 40 μm in diameter. In order to achieve the required planarization of substrate 134, the polishing substrate 130, in one embodiment, has a surface that approaches the same flatness as technological requirements demand.

In one embodiment, the polishing substrate 130 is an engineered substrate of silicon, ceramic materials, quartz, plastics or other suitable material, that is finely polished. An abrasive such as silica or alumina is provided on the surface of polishing substrate 130, sufficient to provide required abrasive for material removal, but fine enough to maintain required planarized substrate 134 surface tolerance. Other suitable abrasives include $Si_3N_4$, SiC, CeO, and polysilicon. In one embodiment, the surface of the engineered polishing substrate has a root mean square surface roughness ranging between 5 angstroms and 500 angstroms. In some embodiments, the root mean square surface roughness can be as high as 5,000 angstroms. In one embodiment the polishing substrate 130 is engineered to be porous to facilitate electrolyte circulation around and access to the surface of the substrate 134 to be planarized. Pores can be natural in the selected substance, or fabricated, and can range from 500 angstroms in diameter up to a millimeter in diameter. Pore density can range between about 5% and about 90%.

In one embodiment, polishing substrate 130 is constructed of an essentially uniform material such as ceramic material, silicon, quartz, plastics and the like. In another embodiment, polishing substrate 130 is constructed as a multi-layered structure with, for example, ceramic materials, silicon, quartz, plastics and the like as a base material, and a surface layer of $SiO_2$, $Si_3N_4$, $Al_2O_3$, SiC, CeO, polysilicon, or other suitable abrasive material. The surface layer is an abrasive layer within tolerance for flatness or planarization requirements as described above. Additional information about alternative embodiments of polishing substrate 130 can be found in co-pending application 10/345,658.

Figure 4A:
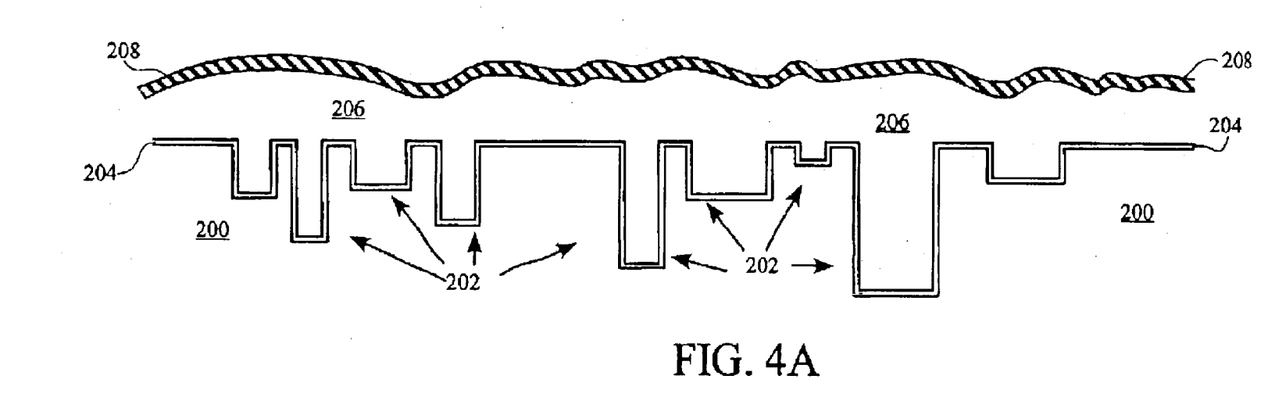
FIG. 4A shows a substrate to be planarized having overburden thereon.
Figure 4B:
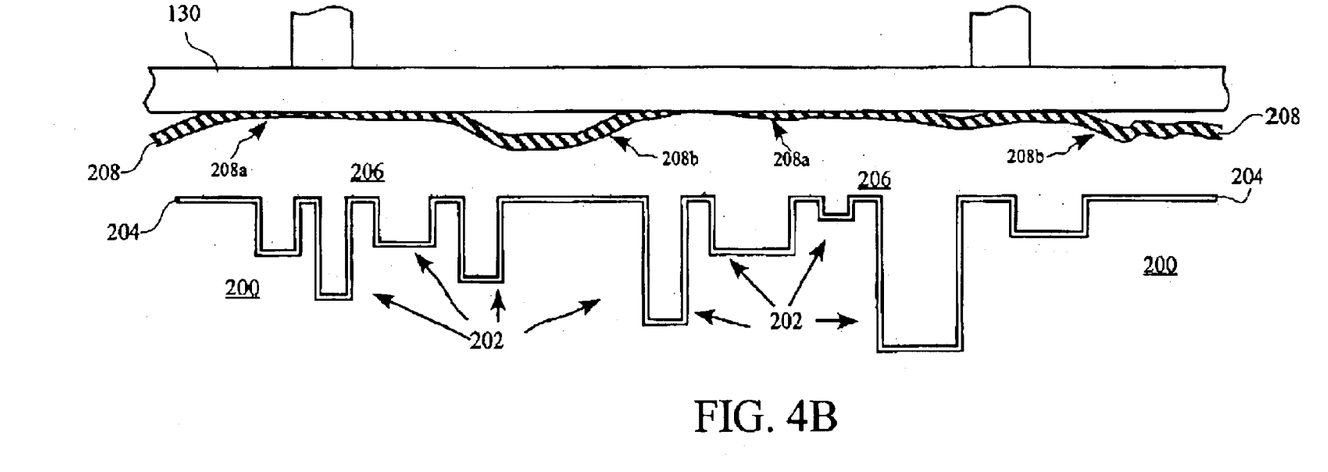
FIG. 4B shows mechanical removal of material in accordance with one embodiment of the invention.

FIGS. 4A and 4B illustrate mechanical material removal using polishing substrate 130 in accordance with one embodiment of the invention. FIG. 4A shows a substrate 200 to be planarized having overburden 206 thereon. Substrate 200 has features 202 defined therein, and a barrier 204 has been formed over substrate 200 and features 202. Overburden 206 represents the excess metal or other conductive fill that has been deposited over substrate 200 to fill features 202. A weak passivation film 208 has been formed over the surface of overburden 206, as described above.

FIG. 4B shows mechanical removal of material in accordance with one embodiment of the invention. In FIG. 4B, polishing substrate 130 is brought into compliance with weak passivation film 208 covering overburden 206. As described above, polishing substrate 130 presents a substantially flat surface with sufficient abrasive to effect material removal of weak passivation film 208, while maintaining stringent tolerance for minimal metal loss in planarized substrate. Polishing substrate 130 is maintained in the plane of the surface of substrate 200m and as polishing substrate 130 is lowered toward substrate 200, mechanical contact occurs between polishing substrate 130 and the highest points 208a of weak passivation film. A minimal downward force of approximately 0.1 psi–0.5 psi is applied by polishing substrate 130 against weak passivation film 208.

In one embodiment, material removal is accomplished by mechanical contact between polishing substrate 130 and highest points 208a of weak passivation film. Low points 208b of weak passivation film, that portion of the weak passivation film 208 not in compliance with polishing substrate 130, do not experience material removal until such a time as mechanical contact with polishing substrate 130 occurs. Underlying conductive fill overburden 206 is protected from electrochemical dissolution and material removal by weak passivation film 208. As described above, application of the electric potential is cycled or pulsed so that continuous dissolution by passivation layer formation does not occur, and material removal is effected by mechanical contact of the polishing substrate 130. In one embodiment, circulation of the electrolyte bath (not shown) for continued formation of weak passivation layer 208 over those areas where material removal has occurred is accomplished through the separation between the polishing substrate 130 and the polishing head 128 (see FIG. 3), and through the porosity of the polishing substrate 130 as described above. As the conductive fill overburden 206 is planarized, material removal is effected by electrochemical formation and mechanical removal of weak passivation layer 208 until planarization at the surface of the substrate 200 is achieved.

Figure 5:
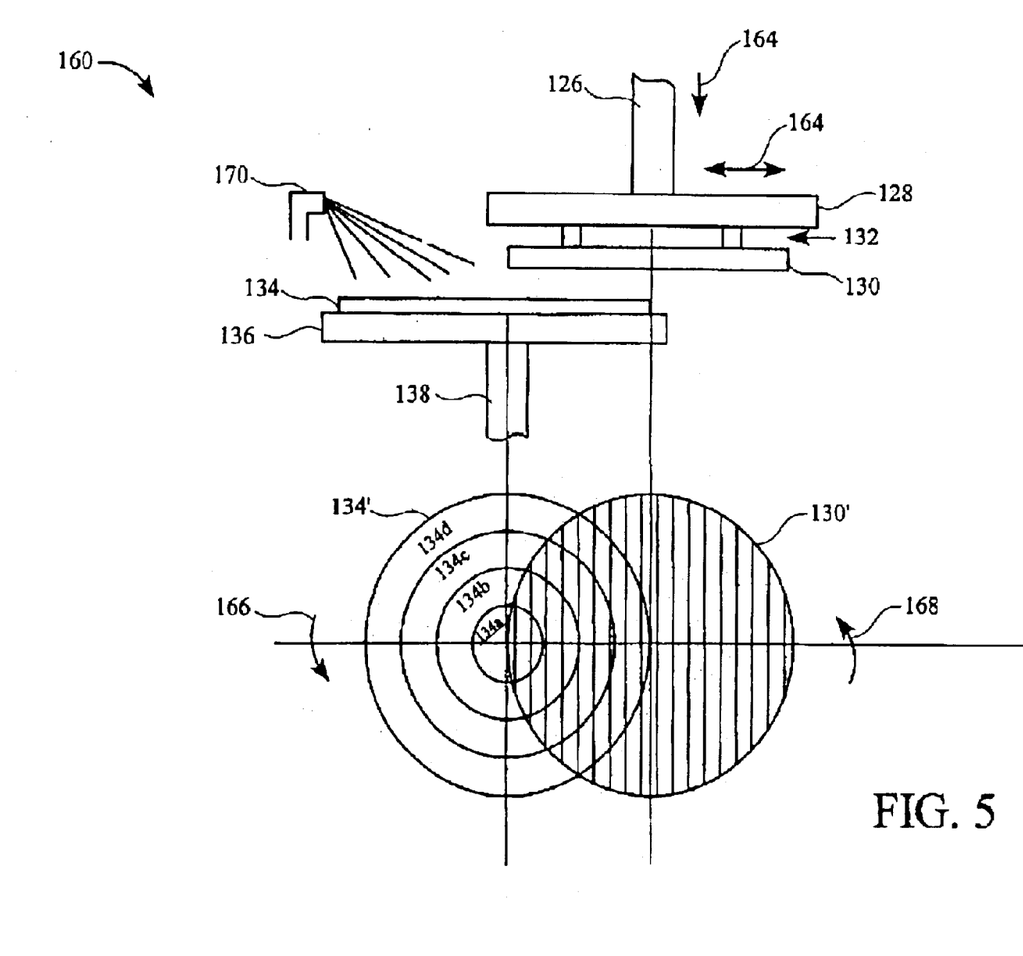
FIG. 5 shows an electrochemical assisted CMP processing configuration in accordance with another embodiment of the invention.

FIG. 5 shows an electrochemical assisted CMP processing configuration 160 in accordance with another embodiment of the invention. In the illustrated embodiment, an upper spindle, 126 holds a polishing head 128, to which is attached a polishing substrate 130. A fixed separation 132 is shown between the polishing head 128 and the polishing substrate 130, allowing the polishing substrate 130 to be completely immersed and surrounded by the electrolyte bath 124. A substrate 134 that is to be planarized is attached to a carrier 136 which is attached to a lower spindle 138.

Metrology 170 is provided to monitor substrate processing and determine end point of processing. In one embodiment, metrology 170 is eddy current sensor metrology, and in other embodiments any desired and effective method of process monitoring and end point detection can be employed. Further, pressure sensors can be implemented with the polishing substrate. One type of pressure sensor is a micro electromechanical systems (MEMS) pressure transducer. Those skilled in the art are familiar with the structure and operation of MEMS pressure transducers. In another embodiment, a MEMS thermal actuator that monitors localized strain or temperature variation is configured. Those skilled in the art are also familiar with the structure and operation of MEMS thermal actuators. Further information about MEMS pressure transducers and thermal actuators is provided in co-pending U.S. patent application Ser. No. 101206,749, filed on Jul. 26, 2002, entitled AFFERENT-BASED POLISHING MEDIA FOR CHEMICAL MECHANICAL PLANARIZATION, and assigned to the same assignee as the present application. Co-pending application 10/206,749 is incorporated herein by reference.

In the illustrated embodiment, mechanical processing may or may not occur in an immersed environment. The illustrated configuration 160 can be immersed in an electrolyte bath (not shown) for formation of the weak passivation film described above. Upper spindle 126 is charged as anode (not shown), and lower spindle 138 is charged as cathode (not shown). A low potential is applied in order to minimize any risk of etching of the overburden of the conductive fill, and to achieve only the formation of a weak passivation film. Mechanical contact between the polishing substrate 130 and the substrate to be planarized 134, the mechanical planarization to effect material removal, can be performed outside of the electrolyte environment, with re-immersion as necessary to maintain the weak passivation film.

As described above, material removal is achieved with mechanical contact when the polishing substrate 130 is brought into contact with the substrate 134 to be planarized. The weak passivation film that is formed over the surface of the conductive fill overburden on substrate 134 is removed by the polishing substrate 130. In one embodiment, a minimal downforce 162 of less than 1 psi, and preferentially of about 0.1 psi to about 0.5 psi is applied by the polishing substrate 130 against the substrate 134 to be planarized. Further, both the polishing substrate 130 and the substrate 134 to be planarized are rotated as shown at 168 and 166, respectively. Polishing substrate 130 is also moved laterally 164 across substrate 134 to be planarized. However, with the minimal downforce as indicated, shear force at the surface 134' of the substrate to be planarized is minimal. Further, manipulation of the combination of downforce 162, lateral movement 164 of the polishing substrate 130, rotation 168 of the polishing substrate 130, and rotation 166 of the substrate 134 to be planarized, provides for significant control of the shear force realized at the surface 134' of the substrate to be planarized.

In the illustrated embodiment, material removal is further controlled with the identification of zones across the surface 134' of the substrate to be planarized. Exemplary zones 134a, 134b, 134c, and 134d are shown. Backside 130' of polishing substrate is shown as it traverses through identified zones across surface 134' of substrate to be planarized. Material removal through CMP can vary according to position on the surface 134' of the substrate to be planarized. Similar characteristics can be realized in electrochemical assisted CMP, and by manipulating the rotational 166, 168, lateral 164, and downforce 162 as described above, preferential control of material removal is realized across the surface 134' of substrate to be planarized.

Figure 6:
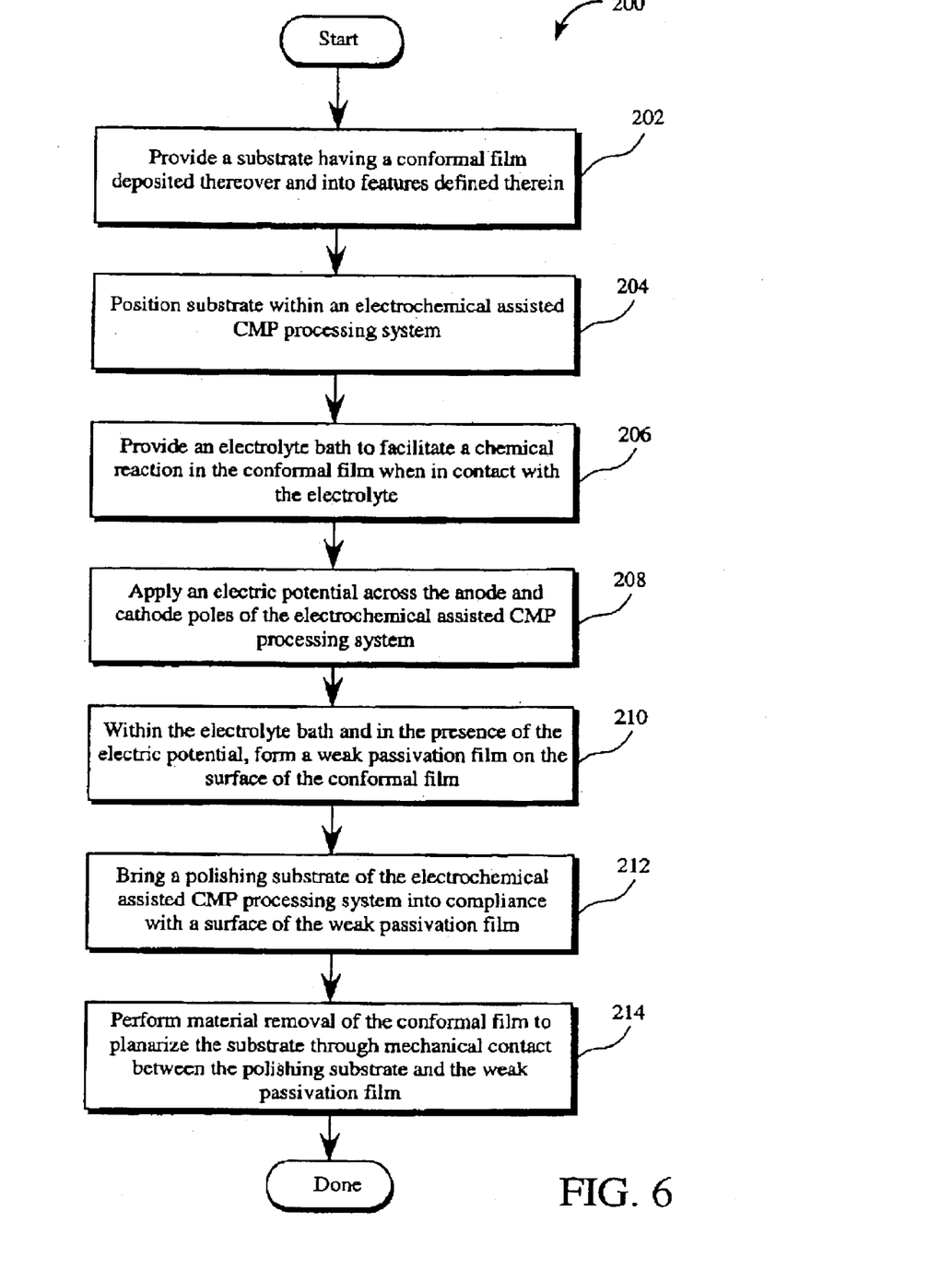
FIG. 6 is a flow chart diagram illustrating the method operations performed in processing a substrate using electrochemical assisted CMP in accordance with one embodiment of the present invention.

FIG. 6 is a flow chart diagram 200 illustrating the method operations performed in processing a substrate using electrochemical assisted CMP in accordance with one embodiment of the present invention. The method begins with operation 202 in which a substrate is provided for processing. In one embodiment, the substrate is a semiconductor wafer in which integrated circuits or other semiconductor structures are being fabricated. Features are defined within the provided substrate such as trenches, vias, interconnect lines, and the like of semiconductor circuitry. A conductive fill such as copper, aluminum, or other desired metal or other conductive material is deposited over the provided substrate, filling the features and leaving an overburden of the conductive fill requiring removal to leave only the features filled and the surface of the substrate planarized.

The method continues with operation 204 in which the substrate is positioned in an electrochemical assisted CMP processing system. The electrochemical assisted CMP processing system can be the system illustrated and described above with reference to FIG. 3, and the system can be configured as illustrated and described above with reference to FIG. 5.

Next, in operation 206, the method includes providing an electrolyte bath to facilitate a chemical reaction in the conductive fill when in contact with the electrolyte. In one embodiment, the electrolyte bath is of known chemical solutions used in electroplating processes. In another embodiment, the electrolyte bath is selected from known CMP slurry chemistries without added abrasives in suspension. The preferred range of the pH of the electrolyte bath is from approximately 2 to approximately 9, and the chemistry of the electrolyte bath is selected based on such factors as the material properties of the conductive fill to be removed, the material properties of the polishing substrate to be utilized, whether or not the removal process will be conducted with the substrate submerged in the electrolyte bath, the amount of material to be removed, the height variation of the overburden of the conductive fill, and other such processing factors.

The method continues with operation 208 in which an electric potential is applied across the anode and cathode poles of the electrochemical assisted CMP processing system. As described above with reference to FIG. 3, one embodiment of the invention includes the application of a weak potential so that etching does not occur. The weak potential is applied in one embodiment by DC power that can be constant, variable, or pulsed, and ranges from 0.1–2 amp/cm$^2$ The weak potential is applied with the substrate submerged in the electrolyte bath in order to initiate the electrochemical reaction desired for substrate processing.

Next, in operation 210, an oxidation layer or a weak passivation film is formed on the surface of the overburden. The formation of the weak passivation film is caused by the electrochemical reaction between the material of the overburden in the presence of the electrolyte bath with a weak potential applied. In one embodiment, the electrochemical reaction is controlled so that only a weak passivation film is formed on the surface of the overburden and no material removal by dissolution or etching occurs. The formation of the weak passivation layer fosters surface material removal as described below, while protecting the underlying metal or other conductive material of the overburden from continued chemical or electrochemical dissolution.

The method continues with operation 212 in which a polishing substrate which a part of the electrochemical assisted CMP processing system is brought into compliance with a surface of the weak passivation film. In one embodiment, the polishing substrate is brought into compliance first with a highest point or points of the passivation film so that as material removal progresses, the polishing substrate planarizes the surface of the substrate. As described above, the polishing substrate is an engineered substrate that can be essentially uniform in composition or fabricated in layers. The polishing substrate can be constructed of ceramic materials, silicon, quartz, plastics, or other such material, and has a root mean square surface roughness of between about 5 angstroms and about 500 angstroms. In one embodiment, the root mean square surface roughness can be up to about 5,000 angstroms. The polishing substrate is porous in one embodiment, with pore size of about 500 angstroms to about one millimeter in diameter, and pore density of between about 5% and about 90%. In the multi-layered polishing substrate, a surface layer can be formed as the abrasive layer, and can be constructed of $SiO_2$, $Si_3N_4$, $Al_2O_3$, SiC, CeO, polysilicon, or any other suitable material to provide the desired abrasive quality with the required flatness to achieve material removal and planarization without exceeding metal loss tolerance.

In operation 214, material removal of the overburden of the conductive fill is accomplished through mechanical contact. As the polishing substrate contacts the highest points of the conductive fill overburden, the weak passivation film is removed through mechanical contact. In one embodiment, material removal is accomplished while maintaining minimum downforce and therefore minimizing the shear stress to which the fragile surface of the substrate is subjected. The downforce, in one embodiment, is less than about 1 psi, and in another embodiment ranges from about 0.1 psi to about 0.5 psi. Those areas of the conductive fill overburden not in contact with the polishing substrate are protected from continued dissolution and material loss or removal by the weak passivation layer. The weak passivation layer is removed through mechanical contact, and continuously reformed through the pulsed, cycled, or otherwise periodic application of the electric potential within the electrolyte bath. The porous polishing substrate and immersion of the polishing substrate foster circulation of the electrolyte bath over the surface of the overburden of the conductive fill during processing. In an embodiment in which material removal is accomplished without the substrate being submerged in the electrolyte bath, the substrate is periodically re-submerged and electric potential applied in order to reform the weak passivation layer in those areas in which it has been mechanically removed. The mechanical contact therefore drives material removal until all of the overburden of the conductive fill has been removed leaving only the features formed in the substrate filled with the remaining metal or other conductive material, and the surface of the substrate planarized. The method is then done.

In summary, the present invention provides an electrochemical assisted CMP for material removal and substrate planarization which minimizes shear stresses experienced at the surface of the substrate, making it ideally suited for porous, low-k dielectric substrates. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. An electrochemical assisted CMP processing system, comprising:
   a substrate processing chamber;
   an electrolyte bath contained within the substrate processing chamber;
   a substrate carrier within the electrolyte bath;
   a polishing head having a polishing substrate attached thereto; and
   a recirculation system for recirculating the electrolyte bath, the recirculation system including chemical analysis, filtration, and temperature control of the electrolyte bath,
   wherein the electrochemical assisted CMP processing system is configured to receive an electric potential with the substrate carrier configured to receive a cathode charge and the polishing head configured to receive an anode charge to create an electrochemical reaction on a surface of a substrate positioned on the substrate carrier and immersed in the electrolyte bath.

2. The electrochemical assisted CMP processing system of claim 1, wherein the polishing substrate is a rigid porous substrate having a root mean square surface roughness of between about 5 angstroms and about 500 angstroms.

3. The electrochemical assisted CMP processing system of claim 1, wherein the polishing substrate is a rigid porous substrate having a root mean square surface roughness of up to about 5,000 angstroms.

4. The electrochemical assisted CMP processing system of claim 1, wherein pores in the rigid porous substrate range in diameter from about 500 angstroms to about one millimeter and a pore density ranges from about 5% to about 90%.

5. The electrochemical assisted CMP processing system of claim 1, wherein the polishing substrate comprises a material selected from a group consisting of silicon, quartz, ceramic materials, and plastics.

6. The electrochemical assisted CMP processing system of claim 1, wherein the polishing substrate is a multi-layer substrate including a base layer comprising a material selected from a group consisting of silicon, quartz, ceramic materials, and plastics, and an abrasive surface layer comprising a material selected from a group consisting of $SiO_2$, $Si_3N_4$, $Al_2O_3$, SiC, CeO, and polysilicon.

7. The electrochemical assisted CMP processing system of claim 1, wherein the polishing substrate has a diameter that is approximately equal to a diameter of a substrate to be planarized.

8. The electrochemical assisted CMP processing system of claim 1, further comprising eddy current metrology to monitor a processing state and end point of processing of a substrate.

* * * * *